Patented June 2, 1925.

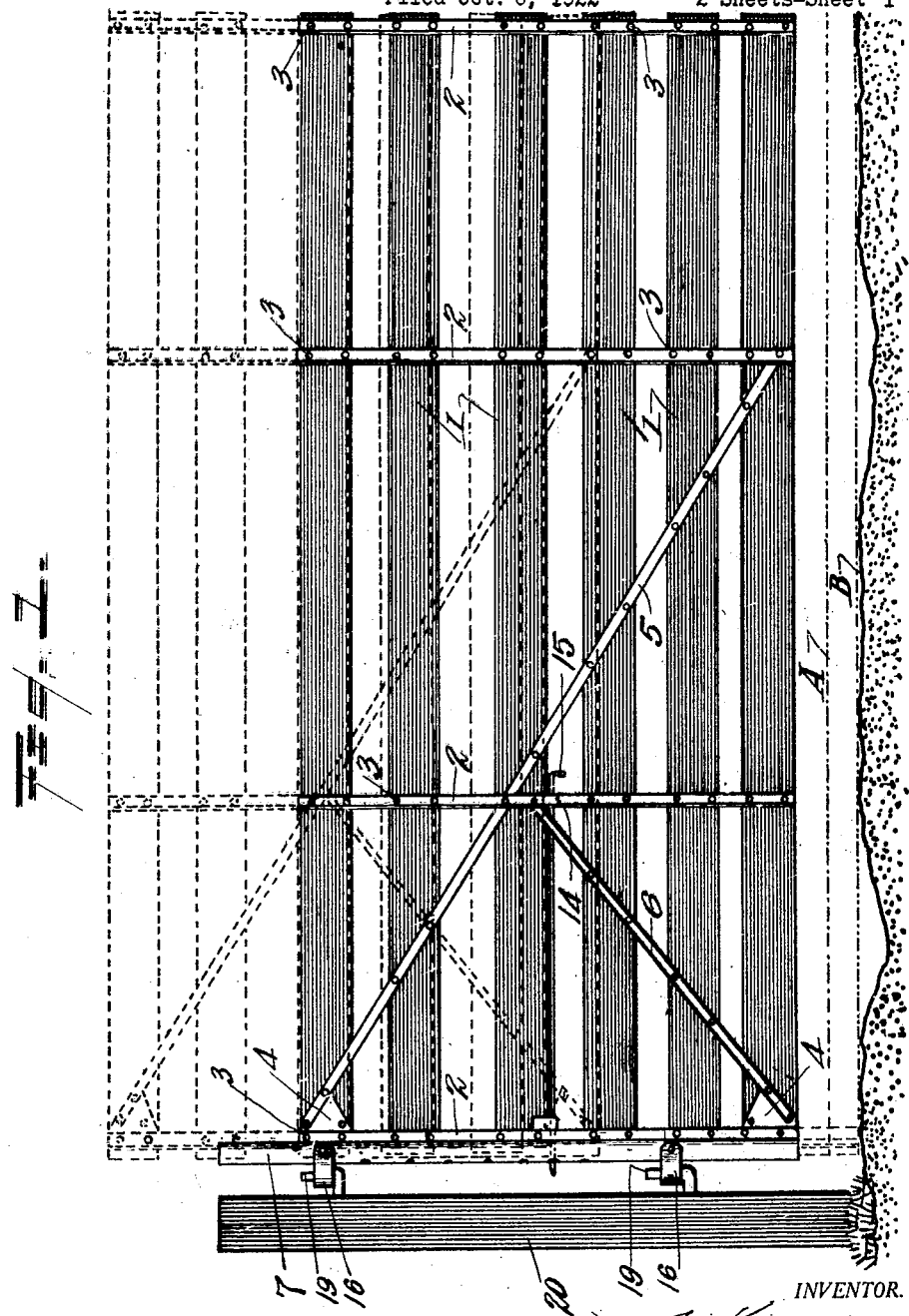

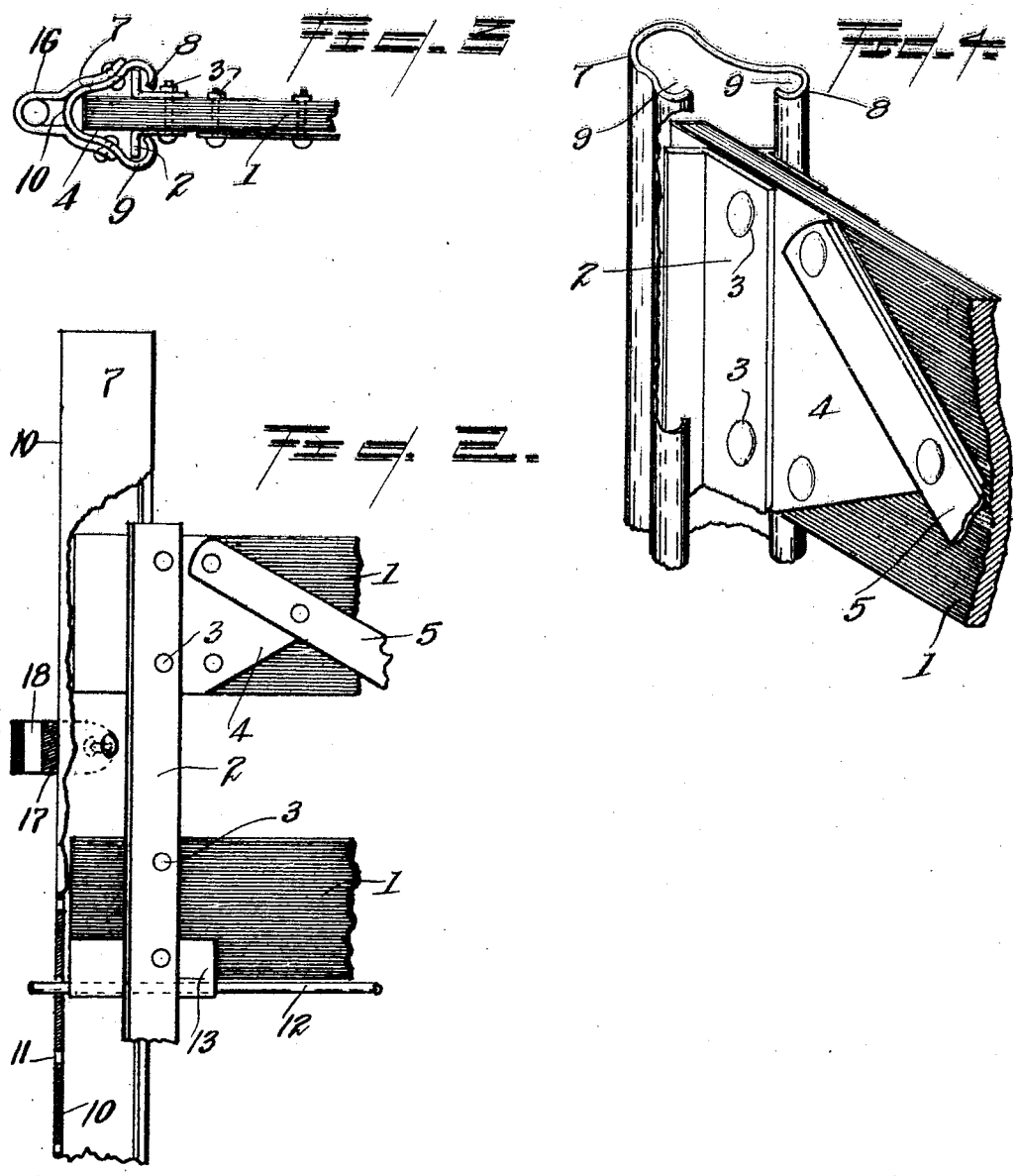

1,539,849

UNITED STATES PATENT OFFICE.

ALFRED W. KNUTSON, OF PEORIA, ILLINOIS, ASSIGNOR TO GEORGE G. BAYNE, OF BUSHNELL, ILLINOIS.

GATE AND ATTACHMENT FOR SAME.

Application filed October 6, 1922. Serial No. 592,820.

*To all whom it may concern:*

Be it known that I, ALFRED W. KNUTSON, a citizen of the United States, a resident of Peoria, in the county of Peoria and State of Illinois, have invented new and useful Improvements in Gates and Attachments for Same, of which the following is a specification.

This invention has reference to improvements in gates and attachments for gates, and it has for its principal object to improve the mountings for farm gates so as to provide a novel structure which will permit of vertical adjustment of the gate.

The invention has for a further object to provide a hinge element with which the gate structure has a substantially telescopic relation, to adapt the raising and lowering of the gate structure into different adjusted positions, and to means for fixing the gate structure in any such adjusted positions, while not interfering with the swingability of the gate.

The invention comprehends a swingable mounting for a farm gate which may be furnished as one element of a complete gate, or such mounting may be furnished as an attachment embodying the invention and applicable to numerous gates now in use, with little or no modification of such gates.

That the invention may be more fully understood, reference is had to the accompanying drawings forming a part of the present description, illustrating a preferred embodiment of the invention, in which:—

Figure 1 is a side elevation of a gate embodying my invention, dotted lines indicating the adjustability of the gate structure on the hinge element;

Figure 2 is a detail in elevation, partly in section, showing the hinge element, gate structure and means for fixing the gate structure in adjusted positions;

Figure 3 is a detail in plan of the hinge element and the connection of the gate structure thereto, and Figure 4 is a perspective view, partly broken away showing the hinge element and how the gate structure is telescopically movable thereon.

Like characters of reference denote corresponding parts throughout the figures.

The type of gate to which the invention more particularly applies is a farm gate hingedly supported to be swung open and closed and mounted for vertical adjustment to enable the gate to be swung over and to clear snow drifts or other obstructions, and also raised when in closed position for the passage of small animals there-beneath and readjusted in lowered position after the passage of such animals. The structure is also such that the gate may be lowered to a definite and fixed position and yet swing, and if ruts appear in the ground caused by wagons or autos which would allow very small animals to crawl beneath the gate, when the gate is in its swinging position, the gate may be dropped and rested on the ground to provide a barrier, which must naturally be lifted again to swinging position to open, else dragged over the ground when opened. Also the invention is preferably intended for farm gates of a type constructed of a plurality of spaced boards connected and braced by angle bars, in a manner well known to the trade. No invention is claimed to the gate structure per se. Such a gate, however, includes the plurality of parallel spaced boards 1 of any suitable number and of any suitable length. These boards are preferably connected by the plurality of sets or pairs of angle irons 2, 2, connected to the boards on opposite sides, as shown, by bolts or rivets 3. One pair of such angles are shown at the swinging end of the gate, one pair at or near the hinge end of the gate, and two pairs suitably spaced mediate the ends of the gate.

To the upper and lower boards 1 and at their hinge ends are connected brace plates 4 which are placed on opposite sides of the boards, and if desired such brace plates may be in the form of U braces, as shown, to embrace and extend over or around the rear ends of such boards. A diagonally disposed brace bar 5 may be provided connected to one of the upper brace plates 4 and extend down and be connected to the lower board where connected by the second set of angles 2. Also a diagonally disposed brace bar 6 may be provided connected to one of the lower brace plates 4 and extend up and be connected to a board 1 at or approximately the point of crossing of the brace bar 5 and the second set of angles from the hinge end of the structure, see Figure 1. Although not shown, the bars 5 and 6 may be duplicated and both sides of the boards 1.

The hinge mounting for the gate, and which may also be provided as an attachment for other gates of a structure similar to that described, comprises preferably an elongated U-shaped channel bar or housing 7 having a clover leaf appearance in cross-section, see Figure 3 with the ends 8 turned inwardly forming longitudinal grooves 9 throughout the length of the bar or housing 7 to provide guides for the outwardly extended flanges of the angle bars 2 at the hinge end of the gate structure. The arcuate bend 10 of said bar or housing 7 is provided with a plurality of spaced transverse openings 11 to receive a locking bar or rod 12 preferably disposed longitudinally of and beneath one of the intermediate boards 1 and guided through a strap 13 secured to such board and also guided between the second pair of angles 2 from the hinge end of the gate and over a transverse bearing member 14 connected to such angles. The inner end of said bar or rod 12 having a hand hold 15 by means of which it may be manipulated to withdraw said bar or rod from an opening 11 in the channel bar or housing 7 and inserted into another of such openings to hold the gate structure in different vertical adjusted positions. To said channel bar or housing 7 are riveted or otherwise suitably secured straps 16 to hold spacing blocks 17, together providing vertical openings 18 to receive pintles 19 of hinge studs secured in a post 20 at one side of the gate opening, see Figure 1.

The member 7 with the straps 16 constitute the hinge element for the gate and may be furnished with a gate or as an attachment for gates.

To assemble the gate structure and the hinge element, the latter is telescoped over the hinge ends of the boards 1 with the angles 2 lying within the grooves or guides 9 in the said hinge element, with the bar or rod 12 inserted through an opening 11 in the hinge element to lock or fix the gate structure in its relation to its hinged element. The gate may then be hung on the post 20 in the manner shown in Figure 1. When the parts are assembled the ends of the boards 1 lie well within the channel bar or housing 7 and thereby prevent sagging of the gate structure when hung, and the hinge element is in close proximity to the hinge post 20 leaving no more open space between gate and post than is found in the most practical gates. The openings 11 in the hinge element 7 are so spaced relatively to the top and bottom ends thereof as to provide for the raising and fixing of the gate at desirable heights and when in its normal lower position the lower edge of the bottom board 1 is even with the lower end of the element 7, although the lower board may be lowered to a point A below the lower end of the element 7 and the bar or rod 12 inserted in the lowermost opening 11 to allow the gate to be swung. If lowered to a point B the lowermost board 1 will rest on the ground and it is not intended it should be swung in such a position. The length of the element 7 not only corresponds to the heighth of the gate structure, but normally projects up above the top board 1 to insure a proper bearing for such gate structure when in a position, such as shown in full lines in Figure 1.

What I claim is:—

A gate structure, comprising a gate including a plurality of spaced boards connected by sets of angle-irons, one set at least located at or near the ends of the boards with outwardly projecting flanges, and a hinge attachment comprising a vertically disposed channel bar having inturned edges to embrace and form guides for the flanges of said set of angles at the end of the gate and to provide a telescopic relation between the gate and angles and said channel bar, and means to fix the gate in adjusted positions on said channel bar.

In witness whereof, I have hereunto affixed my hand this 3rd day of October, 1922.

ALFRED W. KNUTSON.